United States Patent
Jian (10) Patent No.: US 7,631,134 B2
(45) Date of Patent: Dec. 8, 2009

(54) HALF-SIZED PCI CENTRAL PROCESSING UNIT CARD AND COMPUTER DEVICE HAVING THE CAPABILITY OF PCIE EXPANSION

(75) Inventor: Ling-Feng Jian, Jinshan Shiang (TW)

(73) Assignee: IEI Technology Corp., Shi-Chi, Taipei Hsien (TW)

( * ) Notice: Subject to any disclaimer, the term of this patent is extended or adjusted under 35 U.S.C. 154(b) by 93 days.

(21) Appl. No.: 11/589,046

(22) Filed: Oct. 30, 2006

(65) Prior Publication Data
US 2008/0059678 A1 Mar. 6, 2008

(30) Foreign Application Priority Data
Sep. 4, 2006 (TW) .............................. 95215671 U (51) Int. Cl.
*H05K 7/10* (2006.01)
(52) U.S. Cl. ..................... 710/301; 710/302; 710/304; 710/306; 361/785; 361/725
(58) Field of Classification Search ......... 710/301–306, 710/62; 439/62; 361/785, 725–733
See application file for complete search history.

(56) References Cited

U.S. PATENT DOCUMENTS

| 6,567,870 | B1 * | 5/2003 | Thomas et al. ................. 710/62 |
| 6,639,806 | B1 * | 10/2003 | Chuang et al. ............... 361/748 |
| 2005/0120153 | A1 * | 6/2005 | Perez et al. .................... 710/62 |

* cited by examiner

*Primary Examiner*—Mark Rinehart
*Assistant Examiner*—Kim T Huynh
(74) *Attorney, Agent, or Firm*—Winston Hsu (57) ABSTRACT

This invention is to provide a half-sized PCI CPU card and a computer device having the capability of PCIe expansion, wherein the half-sized PCI CPU card comprises a PCI golden finger and a PCIe golden finger aligned at an edge of the half-sized PCI CPU card so that the half-sized PCI CPU card may be inserted by means of the golden fingers into corresponding PCI and PCIe slots provided on a backplane of the computer device, enabling the half-sized PCI CPU card to utilize the hot pull-plug and high transmission properties of the PCIe bus and communicate with a PCIe bus compatible peripheral inserted into the back plane.

3 Claims, 7 Drawing Sheets

HALF-SIZED PCI CENTRAL PROCESSING UNIT CARD AND COMPUTER DEVICE HAVING THE CAPABILITY OF PCIE EXPANSION

BACKGROUND OF THE INVENTION

1. Field of the Invention

This invention relates to a half-sized Peripheral Component Interconnect (hereinafter abbreviated as PCI) CPU card and a computer device, more particularly to a half-sized PCI CPU card and a computer device having PCIe expansion capability for utilizing the hot pull-plug and high transmission properties of the PCIe bus and communicating with a PCIe bus compatible peripheral inserted into a back plane of the computer device.

2. Description of Related Art

Conventionally, Peripheral Component Interconnect (hereinafter abbreviated as PCI) is a bus standard used as an interface between a motherboard and a peripheral device. Generally speaking, devices compatible with the PCI standard can be categorized into the following two different types according to the ways connecting with the motherboard:

(1) as an integrated circuit (IC) directly installed on the motherboard, which is named as "planar device" in the PCI standard; and (2) as an interface card inserted into a slot of the motherboard and having the feature of plug and play.

The PCI bus standard was developed by Intel in year 1990s. On Jun. 22, 1992, Intel announced PCI 1.0 standard that was a standard applying to components. Then, on Apr. 30, 1993, PCI-SIG announced PCI 2.0 standard that was a standard between the connector and the motherboard slot for the first time. Then, PCI standard was soon applied to a server for replacing the original MCA and EISA, and thus became the only one bus expansion provided in the server. In a mainstream personal computer, PCI standard gradually replaced a VESA local bus (VLB). Until the end of 1994, after a second generation of Pentium computer was introduced, PCI standard won significant breakthrough in the market. In year 1996, VLB thoroughly exited from the PC market, and manufacturers even applied the PCI to a 476 computer. Although EISA thereafter worked with PCI until 2000, the subsequent versions of PCIs were continuously upgraded for promotion of their performance. Until year 2004, Intel introduced PCI Express as a serial bus, motherboard manufacturers gradually got rid of the conventional PCI slot and introduced the PCI Express interface.

PCI Express (hereinafter abbreviated as PCIe) is a type of PCI bus, being used for the existing PCI programming concept and communication standard and provided with a faster serial communication system. Generally speaking, PCIe is used for internal interconnection only. Since the PCIe bus is provided on the basis of the existing PCI bus, it only needs to modify the physical layer of the existing PCI bus, but not the software, while converting the existing PCI bus into the PCIe bus. Further, the transmission rate of PCIe bus is higher, so the PCIe bus may be used to replace almost all of the existing internal bus, including AGP and PCI. Intel even hoped to use a PCIe bus controller to communicate with all of the external devices for data transmission so as to replace an existing South Bridge or North Bridge chip.

Even, the PCIe bus was designed mainly for raising the transmission rate of all the buses installed in a computer, so there are many different standards in bandwidth; for example, PCIex16 is a standard dedicated to a display card. Compared with the PCI bus, in the aspect of connection, the PCIe bus is provided on a transmission channel based on a two-sided point-to-point connection, in which different transmission channels are used to transmit and receive different data and four sets of data may be implemented in each channel. Thus, the connection between the two PCIe devices becomes a linkage, forming one or more transmission channels; namely, the linkage where each device supports at least one transmission channel (x1) may also be a linkage for 2, 4, 7, 16, or 32 transmission channel, thereby better bi-directional compatibility being achieved. On the contrary, PCI is connected under control of the bus, and thus all the devices are made to share a unidirectional 32-bit parallel bus.

Figure 1:
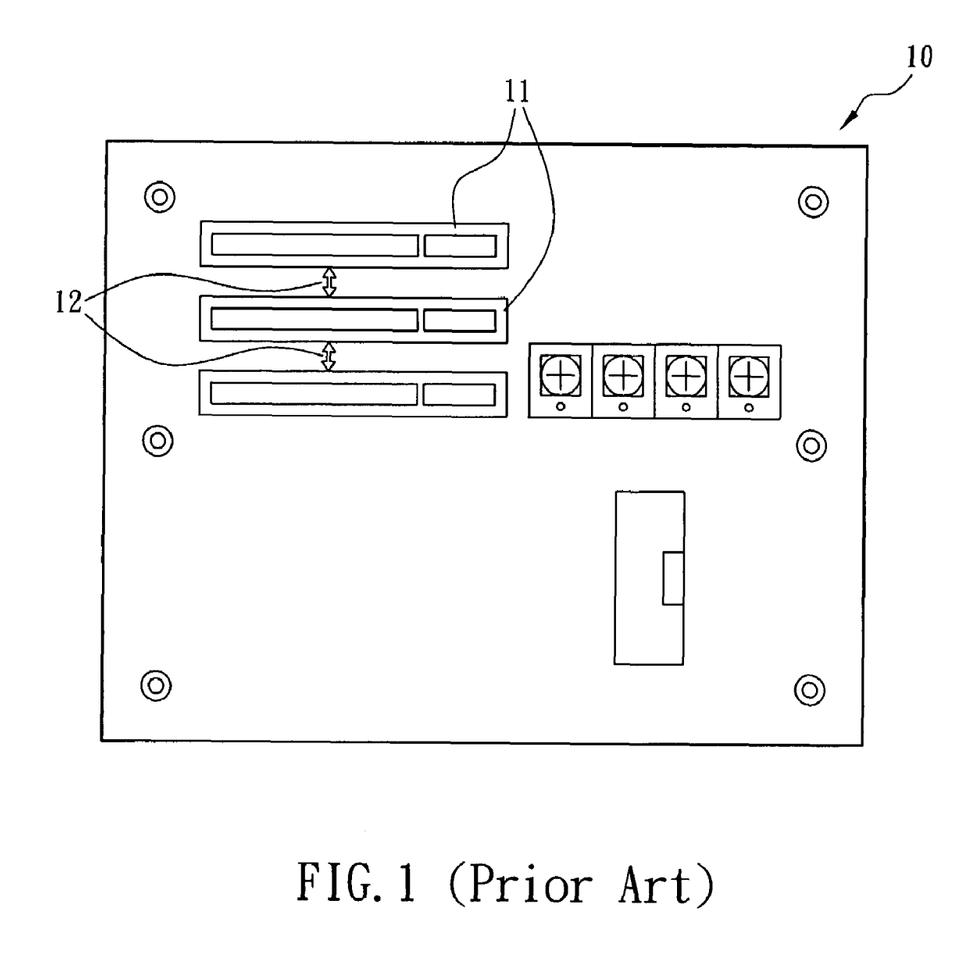
FIG. 1 is a schematic view illustrating the structure of a conventional backplane.

Conventionally, a backplane is provided on an industrial computer or a server, as shown in FIG. 1. The backplane 10 is a printed circuit board on which a plurality of insertion slots 11 are arranged in parallel, in which each pin is electrically connected to each other through the wiring 12 arranged on the backplane 10. Generally speaking, the requirements of pin in each insertion slot 11, such as size and amount, must meet the bus standard connected to the motherboard and the external device(s), such as that of Peripheral Component Interconnect (PCI) bus. Thus, depending on actual requirements, a user may insert a CPU card following the standard of PCI bus into each of the insertion slots 11. In the following description of this invention, the CPU card following PCI bus standard is briefly named PCI CPU Card.

Figure 2:
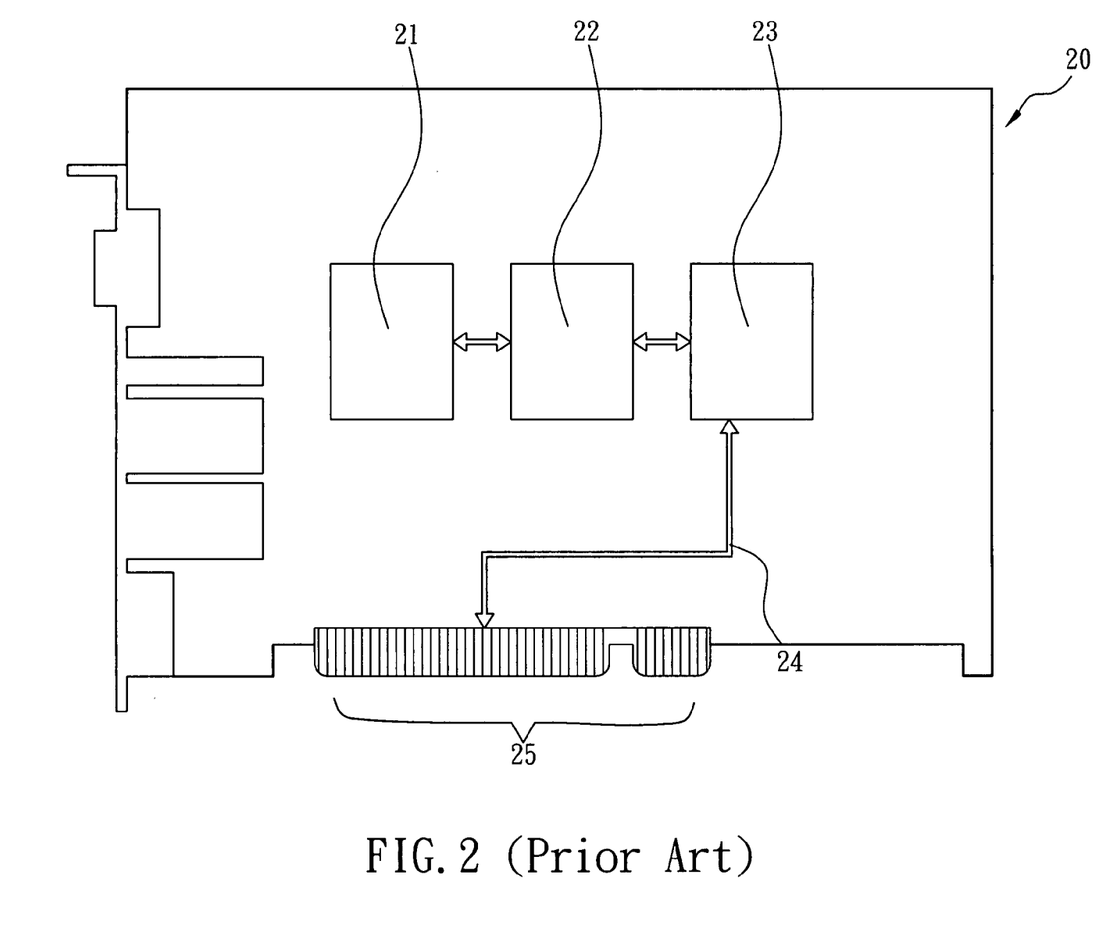
FIG. 2 is a structural schematic view illustrating the circuit of a conventional half-sized PCI CPU card.

Generally speaking, the CPU card is equal to a computer, and upon requests is provided with all interfaces required for normal operation of the computer, such as a VGA component and interface for video control, COM1 and COM2 components and interfaces for communication control, a LPT component and interface for printer control, a Floppy drive control component and interface, an AUDIO component and interface for audio control, a DVD signal I/O interface, a LCD control component and interface, a USB transmission interface and the like. With reference to FIG. 2, the CPU card 20 is mainly made up with a CPU 21, a North Bridge chip 22, and a South Bridge chip 23, in which the North Bridge chip 22 is connected to the CPU 21 and the South Bridge chip 23, and is provided to connect a memory and a video card (not shown) to transmit signals at a high speed among the CPU 21, the memory, and the video card and make the CPU 21 and the South Bridge chip 23 communicate with each other; the South Bridge chip 23 connects a PCI Bus 24, Real Time Clock (not shown), Power Management (not shown), a USB transmission interface (not shown), and other devices to transmit signals at a low speed and make the CPU 21 and the golden finger 25 of PCI bus 24 communicate with each other through the North Bridge chip 22 and the CPU 21 that contact with each other.

In recent years, the PCIe bus being featured with pull and plug, heat exchange, and high transmission efficiency gradually replaces the PCI bus and is applied to various South Bridge chips and peripherals. Thus, manufacturers of the South Bridge chip added a PCIe bus compatible interface design to a newly introduced South Bridge chip, serving as an expansion bus for the South Bridge chip to connect with other high-speed PCIe bus compatible peripherals. However, the size of a conventional half-sized PCI CPU card widely used in the IPC or the server is limited to a specified range. Although the new South Bridge chip compatible to the PCIe bus is used in the half-sized PCI CPU card, due to the limited size, any expansion slot cannot be added to the half-sized PCI CPU card. Thus, the PCIe bus compatible expansion slot is not designed in the conventional half-sized PCI CPU card and its backplane so that the high-speed PCIe bus compatible peripherals (hereinafter abbreviated as PCIe peripherals) cannot be expanded in the half-sized PCI CPU card. Thus, what the manufacturers make great effort to earnestly improve is making the PCIe peripherals to be expandable through the conventional half-sized PCI CPU card and its backplane in the IPC or the server for effective promotion of the efficiency of transmission and operation.

Consequently, because of the technical defects of described above, the applicant keeps on carving unflaggingly through wholehearted experience and research to develop the present invention, which can effectively improve the defects described above.

SUMMARY OF THE INVENTION

In consideration of a conventional half-sized PCI CPU card and its backplane that cannot expand the PCIe peripherals, after long-last diligent research and experiment, this inventor finally developed the half-sized PCI CPU card and a computer device according to this invention that are provided with the expandability of PCIe to effectively elevate the expandability of PCIe peripherals by means of the half-sized PCI CPU card.

It is an objective of this invention to provide a half-sized PCI CPU card having the capability of PCIe expansion. A golden finger meeting standards of PCI and PCIe is provided on the half-sized PCI CPU card. The golden finger are connected to corresponding areas where a South Bridge chip is arranged compatible to PCI and PCIe on the half-sized PCI CPU card so that the half-sized PCI CPU card may be inserted by means of the golden finger into corresponding PCI and PCIe slots that are provided on a backplane.

It is the other objective of this invention to provide a computer backplane having the capability of PCIe expansion. A plurality of slots meeting the standard of PCI bus in parallel on the computer backplane are provided and at least a slot meeting the standard of PCIe is provided on the computer backplane, in which at least one PCIe slot is aligned with one of the PCI slots. Pins of each of the PCI slots are electrically connected through the circuits arranged on the backplane. On the backplane, at least one expansion slot meeting the standard of PCIe bus is further provided. Pins of the PCIe expansion slot are electrically connected through expansion circuits arranged on the backplane to the pins of the PCIe slot. Thus, depending on requests, a user may insert the half-sized PCI CPU card into the corresponding PCI and PCIe slots that are aligned at the same side on the backplane, and insert peripherals meeting the standard of PCIe bus into the PCIe expansion slot so that the half-sized PCI CPU card may use the PCIe slot to communicate with the peripherals inserted into the PCIe expansion slot through the expansion circuits for effective elevation of the expandability of half-sized PCI CPU card.

The above and other objects, features and advantages of the present invention will become apparent from the following detailed description taken with the accompanying drawings.

BRIEF DESCRIPTION OF THE DRAWINGS

We hope that you, the examiner, can further figure out the object, Figure, features, and performance of this invention, so we give embodiments in conjunction with the accompanying drawings and make a detailed description as follows.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3:
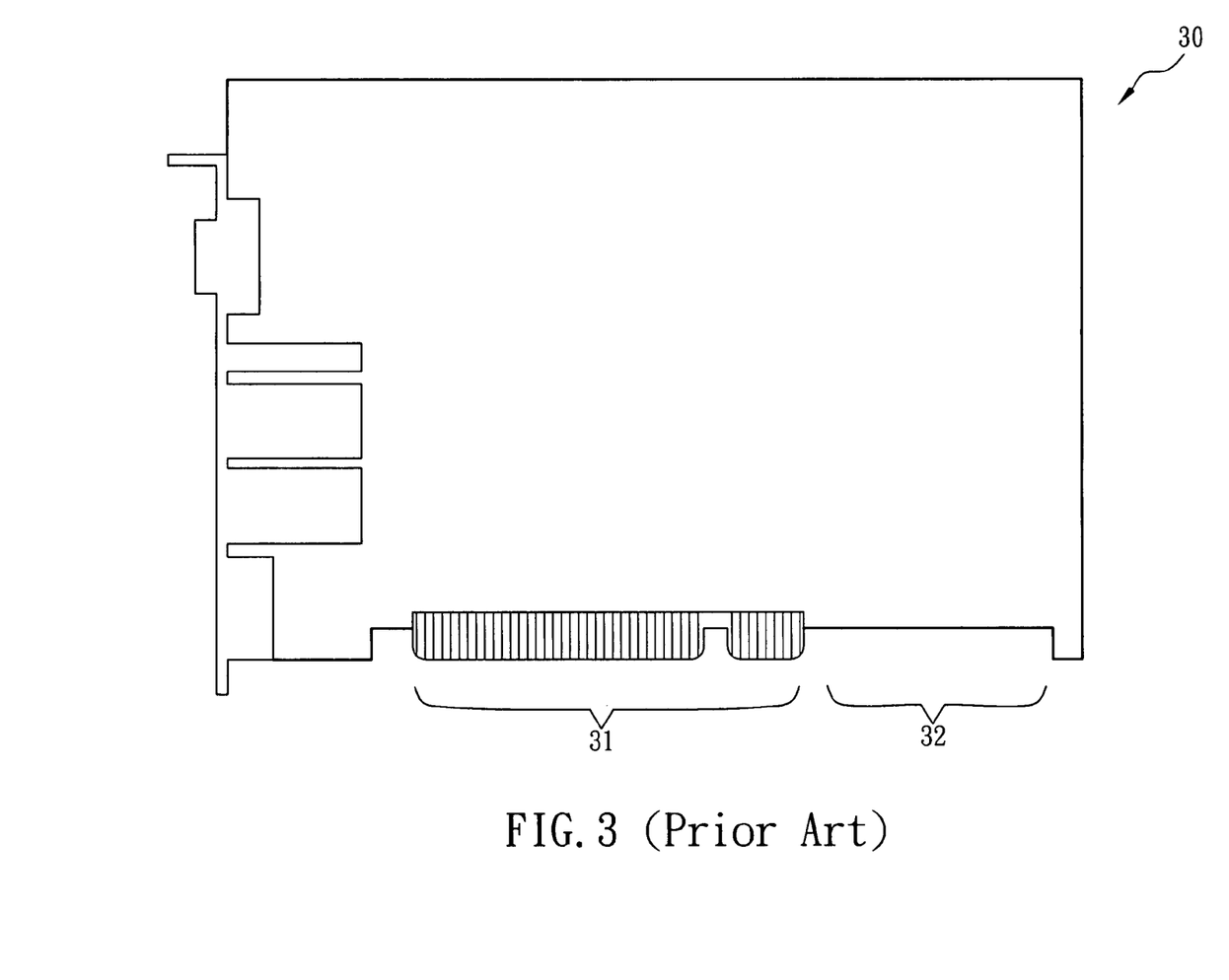
FIG. 3 is a schematic view illustrating a side of the conventional half-sized PCI CPU card.

With reference to FIG. 3, a golden finger 31 meeting the standard of PCI bus is provided at an edge of a conventional half-sized PCI CPU card 30 so that the conventional half-sized PCI CPU card 30 may be inserted into a corresponding PCI slot on a backplane of a conventional IPC or server by means of the PCI golden finger 31. The PCI golden finger 31 are provided at the edge of conventional half-sized PCI CPU card 30 and a certain space 32 is further reserved. In this invention, such a space 32 is used on the half-sized PCI CPU card 30 for increasing the expandability of PCIe peripherals.

Figure 4:
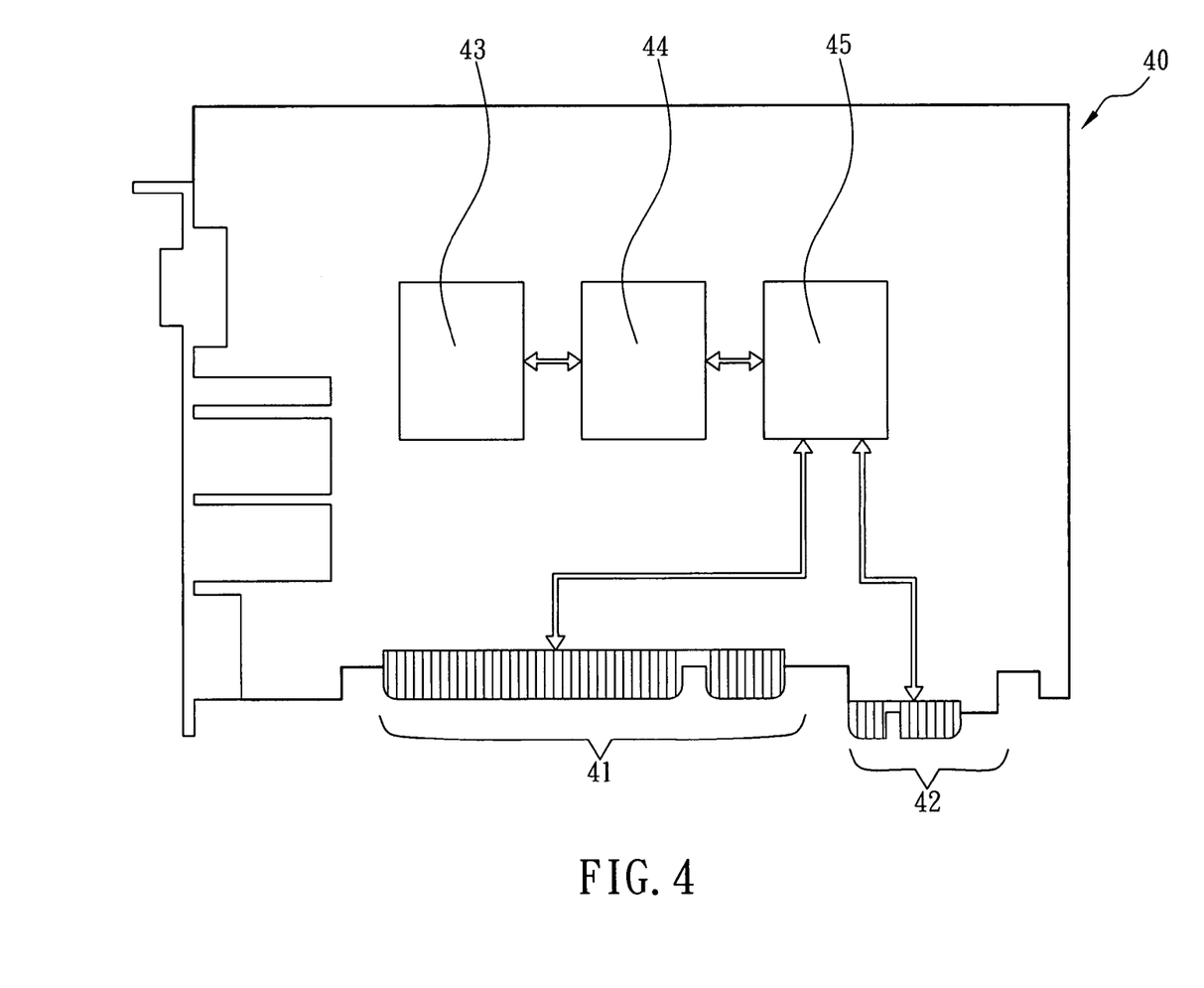
FIG. 4 is a side view of a half-sized PCI CPU card according to this invention.

This invention relates to a half-sized PCI central processing unit card and a computer device having the capability of PCIe expansion. Again with reference to FIG. 3, the reserved space 32 provided at the side of the conventional half-sized PCI CPU card 30 is used. With reference to FIG. 4, at an edge of a printed circuit board of the half-sized PCI CPU card 40 according to this invention, a golden finger 41 meeting the standard of PCI bus and a golden finger 42 meeting the standard of PCIe bus are provided. Again with reference to FIG. 4, the half-sized PCI CPU card 40 further comprises a CPU 43, a North Bridge chip 44, and a South Bridge chip 45, on which, according to actual requirements, control components and interfaces required for normal operation of the computer are provided, in which the North Bridge chip 44 connects to the CPU 43 and the South Bridge chip 45, being connected to a memory and a video card (not shown) provided on the half-sized PCI CPU card 40 for high-speed signal transmission, while the South Bridge chip 45 is connected through circuits arranged on the half-sized PCI CPU card 40 to the PCI golden finger 41, the PCIe golden finger 42, and other devices (such as Real Time Clock, Power Management, and USB transmission interface USB, not shown) for signal transmission therebetween and communicates with the CPU 43 through the North Bridge chip 44 for communication among the CPU 43, the PCI golden finger 41, and the PCIe golden finger 42.

Figure 5:
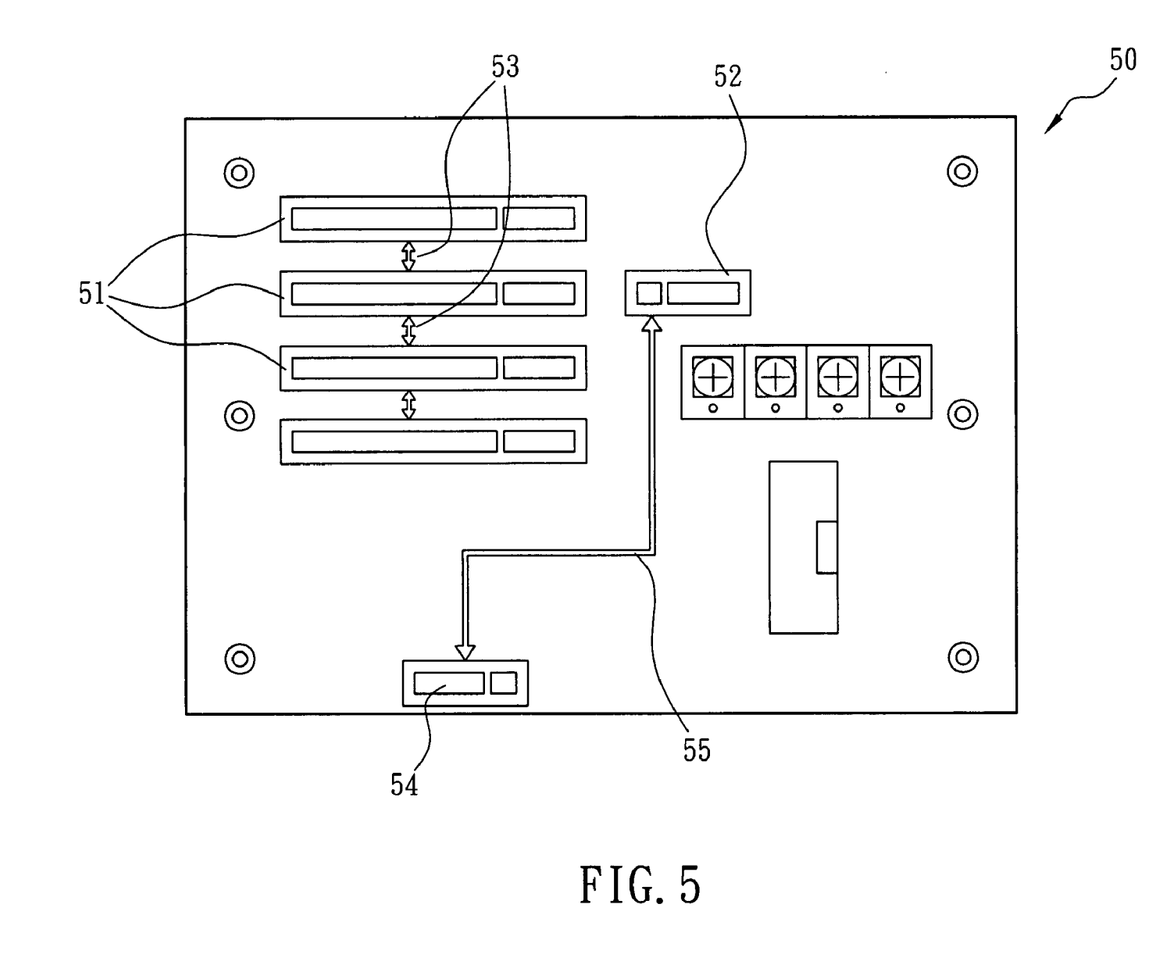
FIG. 5 is a top view of a backplane according to this invention.

In this invention, the backplane 50 for insertion of the half-sized PCI CPU card 40, as shown in FIG. 5, is a printed circuit board on which a plurality of slots 51 meeting the standard of PCI bus and at least one slot 52 meeting the standard of PCIe bus are arranged in parallel. The pins of each of the PCI slots 51 are electrically connected through the circuits 53 arranged on the backplane 50. On the backplane 50, at least one expansion slot 54 meeting the standard of PCIe bus is further provided. The pins of the PCIe expansion slot 54 are electrically connected to the pins of the PCIe slot 52 through the expansion circuits 55 arranged on the backplane 50, in which, according to actual requirements, at least one PCIe slot 52 is aligned with one of the PCI slots 51 at the same side so that the PCI golden finger 41 and the PCIe golden finger 42 that are provided at an edge of the half-sized PCI CPU card 40 in FIG. 4 may be inserted into the corresponding PCI slot 51 and PCIe slot 52 that are provided on the backplane 50, respectively.

Thus, depending on requests, again with reference to FIGS. 4 and 5, a user may insert the half-sized PCI CPU card 40 into the corresponding PCI slot 51 and PCIe slot 52 that are aligned at the same side on the backplane 50, and insert peripherals (not shown) meeting the standard of PCIe bus into the PCIe expansion slot 54 so that the half-sized PCI CPU card 40 may use the PCIe slot 52 to communicate with the peripherals inserted into the PCIe expansion slot 54 through the expansion circuits 55 for effective elevation of the expandability of half-sized PCI CPU card 40.

In the following embodiments of this invention, with reference to FIGS. 6 and 7, description of the design according to this invention is made in detail.

Figure 6:
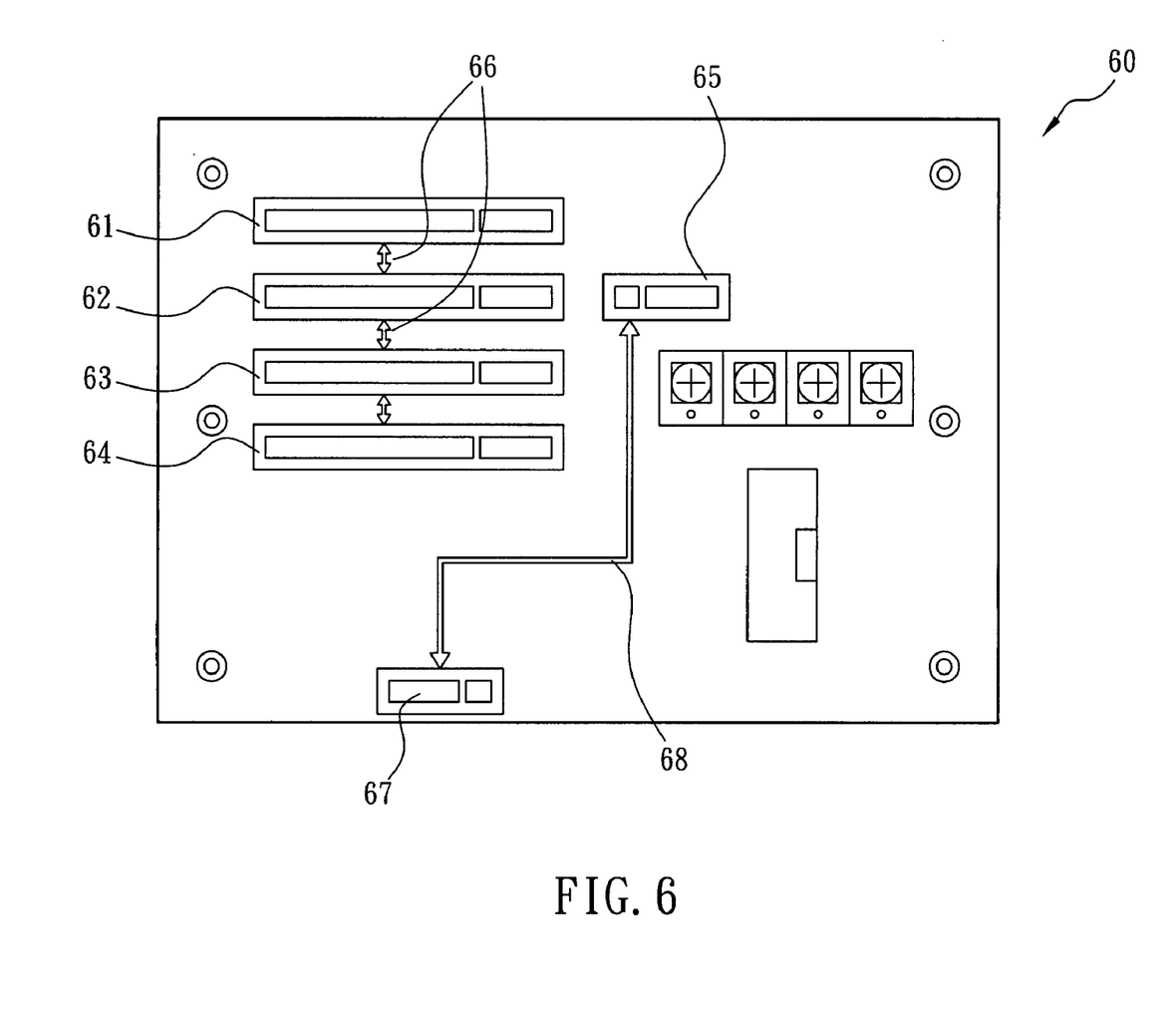
FIG. 6 is a top view of the backplane in an embodiment of this invention.
Figure 7:
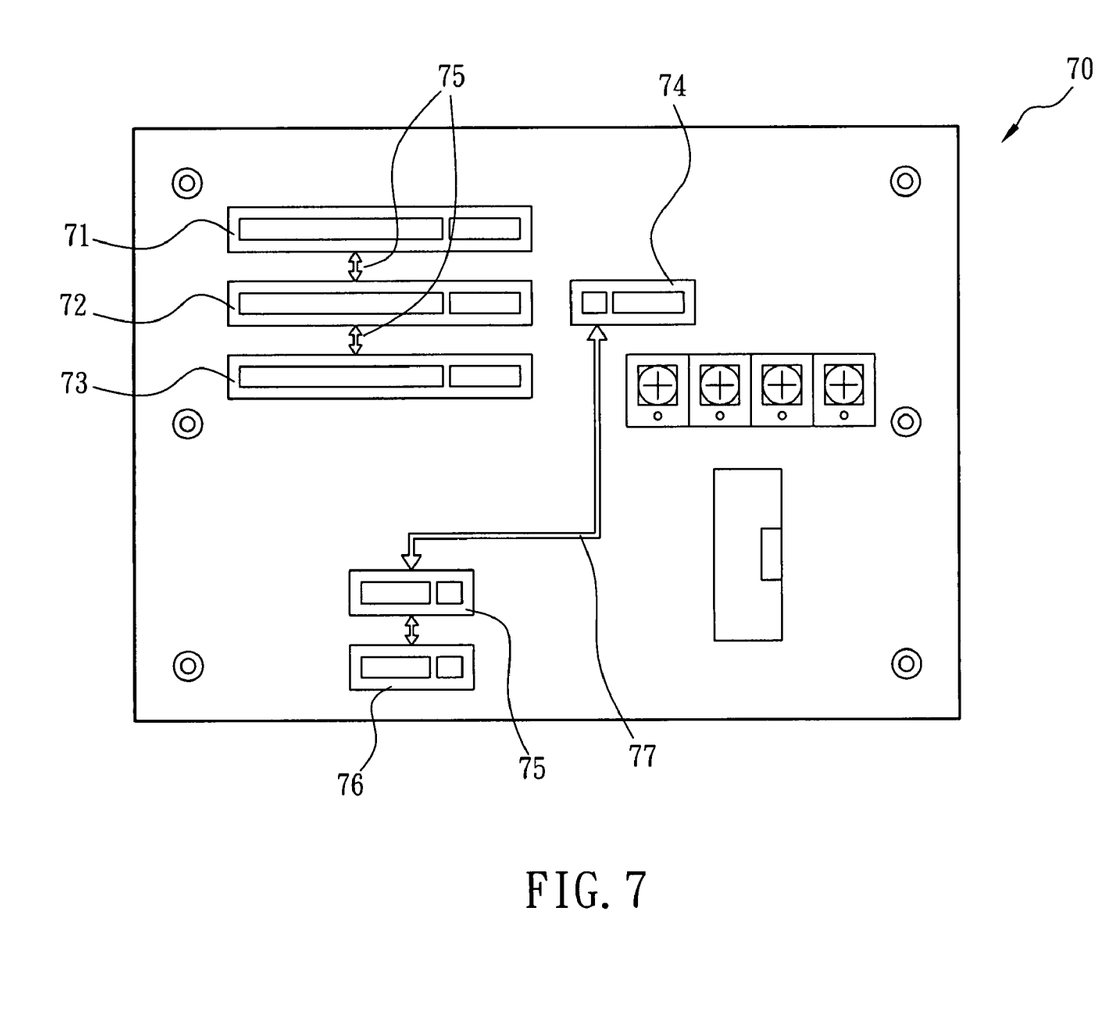
FIG. 7 is a top view of the backplane in the other embodiment of this invention.

In one of the embodiments of this invention, with reference to FIG. 6, 4 slots 61, 62, 63, and 64 meeting the standard of PCI bus and at least a slot 65 meeting the standard of PCIex4 are provided in parallel on the backplane 60. The pins of each of the PCI slots 61, 62, 63, and 64 are electrically connected through the circuits 66 arranged on the backplane 60. On the backplane 60, an expansion slot 67 meeting the standard of PCIex4 is further provided. The pins of the PCIex4 expansion slot 67 are electrically connected to the pins of the PCIex4 slot 65 through the expansion circuits 68 arranged on the backplane 60, and the PCIex4 slot 65 is aligned with the PCI slot 62 so that the PCI golden finger and the PCIex4 golden finger that are provided on the half-sized PCI CPU card may be inserted into the corresponding PCI slot 62 and PCIex4 slot 65 that are provided on the backplane 60, respectively. Thus, depending on requests, the user may insert peripherals (not shown) meeting the PCIex 4 bus standard into the PCIex4 expansion slot 67 so that the half-sized PCI CPU card may use the PCIex4 slot 65 to communicate with the peripherals inserted into the PCIex4 expansion slot 67 through the expansion circuits 68.

In the other embodiment of this invention, again with reference to FIG. 7, 3 slots 71, 72, and 73 meeting the standard of PCI bus and a slot 74 meeting the standard of PCIex4 are provided in parallel on the backplane 70. The pins of each of the PCI slots 71, 72, and 73 are electrically connected through the circuits 75 arranged on the backplane 70. On the backplane 70, two expansion slots 75 and 76 meeting the standard of PCIex1 are further provided, in which the pins are electrically connected to the pins of the PCIex4 slot 74 through the expansion circuits 77 arranged on the backplane, and the PCIex4 slot 74 is aligned with the PCI slot 72 so that the PCI golden finger and the PCIex4 golden finger that are provided on the half-sized PCI CPU card may be inserted into the corresponding PCI slot 72 and PCIex4 slot 74 that are provided on the backplane 70, respectively. Thus, depending on requests, the user may optionally insert one or two peripherals (not shown) meeting the standard of PCIex1 bus into the PCIex1 expansion slots 75 and 76 so that the half-sized PCI CPU card 70 may use the PCIex4 slot 74 to communicate with the peripherals inserted into the PCIex1 expansion slots 75 and 76 through the expansion circuits 77 one after another.

However, in the description mentioned above, only the preferred embodiments according to this invention are provided without limitation to claims of this invention; all those skilled in the art without exception should include the equivalent changes and modifications as falling within the true scope and spirit of the present invention, the amount of modified PCI slots on the backplane, PCIe slots and PCIe expansion slots, PCIe transmission channels (namely 2, 4, 7, 16, or 32 transmission channels), and their permutation and combination; by means of the design, the half-sized PCI CPU card uses the PCIe slot arranged on the backplane to communicate with the peripherals inserted into the PCIe expansion slot through the expansion circuits.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer device having the capability of PCIe expansion, comprising:
    a printed circuit board;
    a plurality of PCI slots meeting the standard of PCI bus and provided in parallel on one side of the printed circuit board, wherein the adjacent PCI slots are electrically connected through circuits arranged on the printed circuit board;
    at least one PCIe slot meeting the standard of PCIe bus and provided on the printed circuit board at the same side aligned with one of the PCI slots;
    at least one PCIe expansion slot meeting the standard of PCIe bus and provided on the printed circuit board at the same side, which is electrically connected to the PCIe slot through expansion circuits arranged on the printed circuit board; and
    at least one first half-sized PCI CPU card, in which a PCI golden finger and a PCIe golden finger are aligned at an edge thereof and inserted, respectively, into the corresponding PCI and PCIe slots on the printed circuit board, and both the PCI golden finger and the PCIe golden finger are connected to a first South Bridge chip on the first half-sized PCI CPU card.

2. The computer device according to claim 1, further comprising:
    at least one second half-sized PCI CPU card, in which a PCI golden finger is provided at an edge and inserted into the corresponding PCI slot on the printed circuit board, and connected to a second South Bridge chip on the second half-sized PCI CPU card.

3. A computer device having the capability of PCIe expansion, comprising:
    a printed circuit board;
    a plurality of PCI slots meeting the standard of PCI bus and provided in parallel on one side of the printed circuit board, wherein the adjacent PCI slots are electrically connected through circuits arranged on the printed circuit board;
    at least one PCIe slot meeting the standard of PCIe bus and provided on the printed circuit board at the same side aligned with one of the PCI slots;
    at least one PCIe expansion slot meeting the standard of PCIe bus and provided on the printed circuit board at the same side, which is electrically connected to the PCIe slot through expansion circuits arranged on the printed circuit board; and
    at least one half-sized PCI CPU card, in which a PCI golden finger is provided at an edge thereof and inserted into the corresponding PCI slot on the printed circuit board, and the PCI golden finger is connected to a South Bridge chip.

* * * * *